3,283,001
1-AMINOADAMANTANE AND PROCESS FOR PURIFYING SAME

Robert L. Brown, West Chester, Pa., and Jack A. Snyder, Claymont, Del., assignors to E. I. du Pont de Nemours and Company, Wilmington, Del., a corporation of Delaware
No Drawing. Filed May 5, 1964, Ser. No. 365,134
4 Claims. (Cl. 260—563)

This invention relates to processes for preparing 1-aminoadamantane.

More particularly, it refers to an improved process for purifying crude 1-aminoadamantane and for preparing 1-aminoadamantane hydrochloride by co-distilling a crude suspension of 1-aminoadamantane with water to obtain purified 1-aminoadamantane, extracting the free amine from the cooled steam distillate with an organic, non-toxic, low-boiling, water-immiscible solvent, said solvent being inert to hydrochloric acid and non-reactive with amine admixing the resulting 1-aminoadamantane solution with an essentially stoichiometrically equivalent amount of anhydrous hydrogen chloride and separating the formed 1-aminoadamantane hydrochloride from the solvent.

We have discovered a means of purifying 1-aminoadamantane from the various impurities usually associated with the preparation of 1-aminoadamantane by steam distilling an alkaline liquor containing crude 1-aminoadamantane. In view of the high melting point of 1-aminoadamantane, about 200° C., one would expect steam distillation or any other type of distillation to be impractical in purifying this compound because of the expected problem of solids plugging condensers, pipes, etc.

The hydrochloride salt of 1-aminoadamantane has recently been discovered to have anti-viral activity. Known procedures for making 1-aminoadamantane hydrochloride such as mixing 1-aminoadamantane in a small amount of water with concentrated hydrochloric acid have been found to have limitations, both in cost and ease of preparing the desired product. Accordingly, a more efficient means for preparing 1-aminoadamantane hydrochloride has been sought.

We have discovered that freshly steam-distilled 1-aminoadamantane solidifies sufficiently slowly above 60° C. when in contact with water that it can be passed as a two-phase liquid stream through ordinary condensers and tubes. This purified 1-aminoadamantane can then be converted to 1-aminoadamantane hydrochloride by the introduction of gaseous hydrogen chloride to form the important hydrochloride salt of 1-aminoadamantane.

Distillation is a widely used means for purifying those organic compounds capable of being handled as liquids below their boiling points. However, some compounds such as 1-aminoadamantane have either a very limited temperature range between their freezing point and boiling point or they pass directly from the solid to the vapor state without liquifying, i.e., they sublime. Sublimation is sometimes used for purifying chemicals but it requires considerably more complex equipment and is therefore more expensive then distillation. For this reason, our discovery of a method for obtaining 1-aminoadamantane as a liquid has far-reaching significance permitting utilization of a simple but highly efficient steam distillation process for purification. We have found that 1-aminoadamantane, in contact with water about 70° C. and preferably about 80° C., forms an unstable hydrate which is liquid at the operating temperature. The composition of the hydrate appears to vary from about 0.5 of a mole of water per mole of amine to about 2 and sometimes 3 moles of water per mole of amine. As measured in sealed tubes containing known mixtures of water and 1-aminoadamantane the true melting point ranges from about 86° C. for compositions containing more than 2 moles water per mole amine to about 95–100° C. for 1 mole water per mole amine. Where less than 0.5 mole of water is present the melting point rises rapidly from about 150° C., i.e., at 0.4 mole of water per mole of amine to over 200° C. anhydrous. The hydrate shows a tendency to super cool. Accordingly, freshly condensed steam-distilled mixtures of 1-aminoadamantane and water can be subcooled to about 60° C. before they solidify. It is therefore essential, in accordance with our invention, to keep the condensing surfaces above 60° C. and preferably above 80° C. through the use of tempered condenser water.

The 1-aminoadamantane hydrate formed in the process described above is a colorless, basic liquid having a melting point in the range of 70° C. to 150° C. As described above the melting range is dependent on the amount of water present. This will usually be from 0.5 to 2.0 moles of water for each mole of 1-aminoadamantane.

Our process has greatest utility in a route to 1-aminoadamantane hydrochloride starting with adamantane as follows:

Adamantane is reacted with 2 to 3 moles of liquid bromine to form 1-bromoadamantane. The excess bromine is then distilled off and the bromo compound dissolved in 2 to 12 moles of acetonitrile. Some acetonitrile may be distilled off to aid in removal of the residual bromine. Then 0.5 to 3.0 moles of concentrated $H_2SO_4$ are added gradually over a period of about one hour to effect the Ritter reaction. The intermediate, dissolved in acetonitrile, is then reacted with an excess of water to form 1-acetamidoadamantane. This reaction can be carried out by adding 1 to 10 moles of water to the nitrile solution to precipitate the acetamido derivative. Alternatively, the nitrile solution can be drowned in a large excess of water, ranging from 10 to 500 moles per mole of acetamido compound. The acetamido compound is then isolated by filtration. It may be dried or left in the form of a wet-filter cake.

Acetamidoadamantane is thereafter converted to 1-amidoadamantane by alkaline hydrolysis. We have found that temperatures on the order of 160 to 220° C. are required for complete hydrolysis in 4 to 16 hours. Longer reaction time or higher temperature can be used but they accomplish little in the way of improved yield.

In most cases, the hydrolysis conditions require reacting under super-atmospheric pressure. In a preferred process, however, satisfactory results are obtained at atmospheric pressure using diethylene glycol as the hydrolysis solvent. About 600 cc. of solvent consisting of water plus solubilizer per gram mole of acetamidoadamantane are used. At least one mole of alkali is required to effect the hydrolysis, and an excess is ordinarily used. We prefer about 3 moles NaOH per mole. At the completion of hydrolysis, any low boiling organic solvent, such as methanol, used in the hydrolysis may be distilled off for discard or reuse.

In accordance with our invention the 1-aminoadamantane made in the manner described above or by some other process is steam distilled from the hydrolysis liquor. Water can be added and the solution heated to effect the co-distillation of water and 1-aminoadamantane or open steam can be introduced directly into the vessel for the distillation. As noted earlier, the 1-aminoadamantane is kept liquid by controlling the condenser to keep the distillate above 60° C. and preferably about 80° C. Super-atmospheric pressure can be used to permit condensing temperatures above even 100° C. but atmospheric operation is preferred. We have found that 10 to 20 pounds of steam per pound of aminoadamantane suffice to recover the product from the hydrolysis liquor.

After distillation the purified 1-aminoadamantane free of non-volatile impurities solidifies in the distillate receiver. To minimize losses, the receivers can be water-jacketed and cooled. The solid 1-aminoadamantane is recovered from the distillate by extracting with a solvent. Any low boiling, water-immiscible solvent can be used which does not react with either the free amine or with HCl. Ethers, aliphatic or aromatic hydrocarbons, and a variety of halogenated paraffins can be used. Typical of these are diethyl ether, hexane, benzene, methylene chloride, carbon tetrachloride, chloroform and the like. Outstanding results are obtained by using as a solvent hexane, or methylene chloride, particularly the latter.

One or two extractions with a total of 5 to 10 pounds of solvent per pound of 1-aminoadamantane effectively recovers the 1-aminoadamantane from the steam distillate. Various water-soluble volatile impurities carried over during the steam distillation are left in the water and are discarded.

The solution of amine can be dried to remove traces of water. Distillation or chemical drying agents well known to the art can be used. We achieved the best results by not drying the extract but merely decanting any free aqueous phase entrained in the solution. It is preferable to add an additional 5 to 10 pounds of solvent per pound of 1-aminoadamantane before converting to hydrochloride, since it gives a more mobile slurry.

Anhydrous hydrogen chloride stoichiometrically equivalent to the 1-aminoadamantane present is then introduced at 0 to 40° C. to form the hydrochloride salt. It is important that a very slight excess of hydrogen chloride be added to avoid leaving any free amine in the product. One to two percent is preferred. Larger excess of HCl results in reduced yields.

The following additional examples further illustrate our process.

EXAMPLE 1

*Bromoadamantane from adamantane*

A 50 gallon agitated vessel is fitted with a condenser suitable for either refluxing or take-off. Five hundred pounds of bromine are charged and the temperature of the bromine adjusted to 27° C. Then 151 pounds of adamantane are added portionwise over a 5 hour period, keeping the temperature at 27–28° C. throughout the addition. The condenser is set for total reflux and the batch gradually heated to reflux temperature of 79° C. where it is held for 2 hours. The condenser is then set for total take-off and 162 pounds of bromine are distilled out, the temperature of the reaction reaching 105° C. The system is cooled to room temperature and the pressure is reduced and maintained at 180 mm. of mercury while the temperature is gradually raised to 101° C. In this way 90 more pounds of bromine are distilled out. Then the system is cooled to 40° C. and 65 pounds of acetonitrile are added. The pressure is adjusted to 230 mm. of mercury and heat applied. Distillate is taken out after the temperature reaches 45° C. Fresh acetonitrile is added to the system at a rate equal to that of the distillate going out. The acetonitrile fed in this way amounts to 198 pounds. The distillate obtained weighs 200 pounds. The pressure is increased to atmospheric and 65 pounds of fresh acetonitrile is added. The slurry obtained in this way weighs 405 pounds and contains 235 pounds of 1-bromoadamantane.

EXAMPLE 2

*Acetamidoadamantane from 1-bromoadamantane*

A 50 gallon agitated vessel is charged with 160 pounds of a slurry of 1-bromoadamantane in acetonitrile containing 2.10 pounds of acetonitrile per pound of 1-bromoadamantane. The batch is heated to 62° C. and concentrated sulfuric acid fed at a rate of 1.50 pounds per minute. Cooling is required to maintain a reaction temperature of 62 to 64° C. After 44 pounds of acid is fed, the heat evolution increases rapidly, requiring the acid stream to be shut off momentarily and full cooling water applied. The addition of acid is continued until a total of 75 pounds of acid is fed. At the end of a 90-minute holding period at 64° C., the reaction mass is fed slowly into 250 gallons of water in a well-agitated vessel. The drowning step requires 30 minutes.

The aqueous slurry is then agitated for one hour and filtered. The solids obtained are washed with water and the wet cake is divided into two equal portions. One portion is dried under vacuum at 50° C. The weight of 1-acetamidoadamantane obtained is 20.7 pounds. The second portion is kept wet with a water content of 55%.

EXAMPLE 3

(a) *Hydrolysis of 1-acetamidoadamantane*

A 50 gallon agitated vessel is charged with 159 pounds of diethylene glycol, 31.4 pounds of anhydrous sodium hydroxide and 51.1 pounds of dry 1-acetamidoadamantane. The mixture is agitated and heated to 170° C. and then held at this temperature for 6 hours. The batch is cooled to 95° C. and 30 gallons of water is added. The slurry thus obtained contains 39.8 pounds of 1-aminoadamantane.

A portion of this hydrolysis liquor weighing 260 pounds and containing 21.5 pounds of 1-aminoadamantane is charged to a 50 gallon still pot. The material is agitated and heated to 85° C. Open steam is then fed beneath the liquid surface. After the temperature reaches 102° C. a two phase mixture of 1-aminoadamantane hydrate and water distills over. This mixture is condensed in a jacketed condenser supplied with tempered 55° C. cooling water and operated at a rate which keeps the two-phase liquid condensate between 60 and 90° C. The 1-aminoadamantane hydrate can be recovered at this point by decanting the top layer. After about 3 hours the distillate becomes essentially clear, indicating that all the 1-aminoadamantane has been distilled. The contents of the distillate receiver are cooled to 35° C.

Thereafter 50 pounds of methylene chloride are added, agitated for 5 minutes, and the two liquid phases allowed to separate for 20 minutes. The lower phase, consisting of methylene chloride and dissolved 1-aminoadamantane, is removed. The extraction of the amine is repeated two more times, using 36 pounds of methylene chloride in each. The three methylene chloride extracts are blended. Analysis shows that the 134 pounds of solution contains 19.5 pounds of 1-aminoadamantane.

(b) *Hydrolysis of 1-acetamidoadamantane*

A 50 gallon agitated pressure vessel is charged with 129 pounds of methanol, 55 pounds of water, 62.8 pounds of 50% sodium hydroxide aqueous solution and 51.1 pounds of dry 1-acetamidoadamantane. Agitation is started and heat applied externally until the system reaches a temperature of 170° C. and an absolute pressure of 220 pounds per square inch. The system is held at 170° C. for 20 hours, and then cooled to 25° C. The slurry obtained contains 39 pounds of 1-aminoadamantane. A 298 pound portion of the hydrolysis product is diluted with 250 pounds of water and heated to 95° C. over a period of one hour while 172 pounds of distillate are collected in the receiver. The distillate, containing 75% methanol, is held for recycle. Steam distillation and extraction is then carried out as in 3(a) above to recover 128 pounds of methylene chloride solution containing 18.8 pounds of aminoadamantane.

(c) *Hydrolysis of 7-acetamidoadamantane*

A 50 gallon agitated pressure vessel is charged with 110 pounds of ethylene glycol, 84 pounds of water, 12.7 pounds of anhydrous sodium hydroxide and 46.0 pounds of wet 1-acetamidoadamantane filter cake containing 55% water. The system is agitated and heated to 170° C. at an autogenous pressure of 125 pounds per square inch. The system is held at 170° C. for 16 hours. The reaction mass is then cooled to 25° C., the pressure released to atmospheric and 20 gallons of water added. The system thus formed contains 16.0 pounds of 1-aminoadamantane. The product is steam distilled and the distillate extracted as in 3(a) above to recover 98 pounds of methylene chloride solution containing 14.5 pounds of 1-aminoadamantane.

EXAMPLE 4

*Aminoadamantane hydrochloride from 1-aminoadamantane*

The methylene chloride extract from 3(a) is charged to a 50 gallon agitated vessel. An additional 250 pounds of methylene chloride is added. The diluted solution is agitated and held at 11° C. while anhydrous hydrogen chloride is fed underneath the liquid surface at a rate of about 3 pounds per hour. A total of 4.73 pounds anhydrous HCl is fed. The resulting slurry is cooled to 2° C. and filtered. The filter cake is washed three times with 25 pounds of methylene chloride and dried under vacuum at 50° C. The weight of dry 1-aminoadamantane hydrochloride obtained is 22.0 pounds.

EXAMPLE 5

*Preparation of hydrate of 1-aminoadamantane*

Five grams of crystalline 1-aminoadamantane and twelve grams of water are admixed in a test tube and heated in a water bath to 85° C. The 1-aminoadamantane melts and forms the amine hydrate which floats on top of the water. A sample of this upper layer is removed by means of a heated pipette and is allowed to solidify. This sample is analyzed for water and is found to contain 20% by weight, equivalent to about 2 moles of water per mole of amine. The product is a colorless, crystalline material melting at 93° C. and turning litmus paper blue.

The invention claimed is:

1. A hydrate of 1-aminoadamantane having the following properties:
   (A) melting point in the range of 70 to 150° C.,
   (B) containing 0.5 to 2.0 moles of water per mole of 1-aminoadamantane,
   (C) colorless and
   (D) turns litmus paper blue.

2. A process for purifying 1-aminoadamantane comprising:
   (A) co-distilling an aqueous suspension of crude 1-aminoadamantane with water,
   (B) condensing the vapors produced in step A,
   (C) maintaining the resulting condensate at 60° C. to 120° C. until it has left the condenser and
   (D) separating the purified 1-aminoadamantane.

3. A process for preparing 1-aminoadamantane hydrochloride comprising:
   (A) co-distilling an aqueous suspension of crude 1-aminoadamantane with water,
   (B) extracting the free amine from the cooled steam distillate with an organic, non-toxic, low-boiling, water-immiscible solvent, said solvent being inert to hydrochloric acid and non-reactive with amine,
   (C) admixing the resulting 1-aminoadamantane solution with an essentially stoichiometrically equivalent amount of anhydrous hydrogen chloride and
   (D) separating the formed 1-aminoadamantane hydrochloride from the solvent.

4. The process according to claim 3 wherein the solvent is methylene chloride.

References Cited by the Examiner

FOREIGN PATENTS 925,728   5/1963   Great Britain.

OTHER REFERENCES

Haaf, "Angew. Chem.", vol. 73, page 144 (1961).
Stetler et al., "Chem. Ber.", vol. 93, pages 226–30 (1960).
1,088,952, September 1960, 3 page spec., German printed, application (McKeever et al.).

CHARLES B. PARKER, *Primary Examiner.*

ROBERT V. HINES, *Assistant Examiner.*